(12) United States Patent
Eberlein et al.

(10) Patent No.: US 6,973,121 B1
(45) Date of Patent: Dec. 6, 2005

(54) REPEATER SYSTEM AND METHOD OF RECEIVING A MODULATED INPUT SIGNAL AND TRANSMITTING A MODULATED OUTPUT SIGNAL

(75) Inventors: Ernst Eberlein, Grossenseebach (DE); Josef Bernhard, Erlangen (DE); Christian Paul, Erlangen (DE); Thomas Von Der Gruen, Kleinsendelbach (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/936,250

(22) PCT Filed: Mar. 16, 1999

(86) PCT No.: PCT/EP99/01721

§ 371 (c)(1),
(2), (4) Date: Oct. 9, 2001

(87) PCT Pub. No.: WO00/55996

PCT Pub. Date: Sep. 21, 2000

(51) Int. Cl.$^7$ .......... H04B 17/02; H04B 1/66; H03K 9/00; H04L 25/00
(52) U.S. Cl. ............ 375/211; 375/376; 375/216; 375/240
(58) Field of Search ............. 375/211, 216, 200, 375/316, 327; 370/323, 315; 455/84

(56) References Cited

U.S. PATENT DOCUMENTS

| 4,608,699 A | 8/1986 | Batlivala et al. |
| 5,010,317 A | 4/1991 | Kuznicki et al. |
| 5,107,488 A | 4/1992 | Schreder et al. |

*Primary Examiner*—Stephen Chin
*Assistant Examiner*—Cicely Ware
(74) *Attorney, Agent, or Firm*—Dougherty, Clements & Hofer

(57) ABSTRACT

A repeater system for receiving a modulated input signal and for transmitting a modulated output signal comprising a clock oscillator for providing a repeater system clock, a demodulator for demodulating an input signal and a modulator for modulating the demodulated signal to obtain a modulated signal. The demodulator comprises a first mixer, a first controllable oscillator and a feedback circuit, the first controllable oscillator being controlled by a first control value such that the frequency of the demodulated signal approaches a desired value. The modulator comprises a second mixer and a second controllable oscillator, the second controllable oscillator being controlled by a second control value such that the modulated output signal has a predetermined output frequency. A controller derives the second control value.

16 Claims, 5 Drawing Sheets

REPEATER SYSTEM AND METHOD OF RECEIVING A MODULATED INPUT SIGNAL AND TRANSMITTING A MODULATED OUTPUT SIGNAL

BACKGROUND OF THE INVENTION

The present invention relates to a radio transmission system, which comprises a network of transmitters operating with substantially the same carrier frequencies and, in particular, to a repeater system for such a transmission system.

Such transmission system may be used for private networks for transmitting information signals to mobile receivers or for the transmission of several high quality radio programs to a receiving area. Since a high spectral congestion exists, and bandwidths for transmission are very limited, radio transmission systems having a plurality of transmitters, or transmitters operating on substantially the same frequency, have been investigated. Such radio transmission systems are called single frequency networks (SFNs).

However, such systems cause some problems as regarding the reception. One problem is caused by interferences between transmission signals of the same frequency, which are received from several transmitters. In receiving areas where the signals are received with levels which are very near to one another, these interferences may result in an almost complete disappearance of the total signal received by the receiver. A problem is caused by the fact that, even if precautions have been taken to apply the same information signals synchronously to the different transmitters of the network, a receiver does not synchronously receive these signals, particularly from the two transmitters nearest to the receiver because of the difference in propagation time of the carrier signals. The same information signals coming from the two nearest transmitters, which have been subjected to different delays, then overlap.

For a satellite digital radio transmission system, receiving problems exist in urban areas which comprise many high buildings and many streets lined by high buildings on both sides. These buildings obstruct the "line of sight", thus dramatically reducing the reception field strength at the receiver. To overcome this problem, the satellite transmission system is supplemented by terresterial retransmission or rebroadcasting to provide a high service availability for receivers in density populated areas and, in particular, for mobile receivers that are located in vehicles, for example cars or trucks.

Since bandwidth is limited and spectral congestion is high, which is particularly true for density populated areas, a single frequency network is used for such a terresterial retransmission.

U.S. Pat. No. 4,385,381 discloses a digital radio transmission system implemented as a single frequency network. To overcome the above outlined problems with fading and synchronity, frequency-division multiplex techniques are suggested to solve the problem of overlap between the information signals. To solve the problem of fading caused by interferences between carrier signals having the same frequencies, different transmitters are used which operate with three slightly different carrier frequencies.

Another solution to this problem is the use of a certain format of the baseband signal to be converted and transmitted. Such a format includes certain guard intervals, etc., in order to avoid errors in the receiver caused by the simultaneous reception of two different transmitters which operate on the same frequency.

In a single frequency network, it is critical that all transmitters really transmit on exactly that frequency they are required to. When a typical scenario is considered, a satellite transmits at a center frequency of about 2.34 GHz. The required accuracy of each transmitter in the single frequency network amounts to below ±20 Hz which translates into a frequency tolerance of below ±0.01 ppm (parts per million).

In FIG. 5, a typical repeater system for a single frequency network is shown. The repeater system comprises a receiver antenna 200 for receiving the satellite signal and a bandpass filter 202 by which the satellite signal is filtered. The bandpass filter 202 is connected to a RF tuner for down-converting the filtered satellite signal. A QPSK demodulator 206 is used for demodulating the down-converted satellite signal if the satellite signal has been modulated using the QPSK modulation technique which is well known in the art. The demodulated signal output by the QPSK demodulator typically is input into a time delay stage 208 to be again modulated by a modulator 210. In order to enhance the spectral efficiency of these systems, many systems rely on multicarrier modulation (MCM) techniques. In this case, the modulator 210 may be implemented as a MCM modulator. The complex output signal of the modulator 210 is input into an up-converter 212 in order to up-convert the demodulated and again modulated satellite signal such that this signal has a predetermined output frequency of the repeater system shown in FIG. 5. The up-converter signal is input into a driver and automatic level control block 214 and, from there, to a power amplifier stage 216. The output signal of the power amplifier 216 is filtered by a transmission bandpass 218 and, finally, transmitted by a transmitter antenna 220.

As it is shown in FIG. 5, the individual blocks can be controlled by a controller 222. Active circuit elements of the components in FIG. 5 are also connected to a power supply 224. As it has already been outlined above, the terresterial network of a SFN system is based upon such repeater systems which are located within the service area of obstructed satellite reception. In general, these repeaters receive the QPSK modulated satellite signal, perform a reformating of the carrier and transmit the multicarrier modulated signal on a new output frequency. Within the single frequency network, the repeater output signals transmitted via their transmission antennas 220 are required to have substantially the same frequency. More detailed, the frequency deviation of output signals of different repeater systems has to be smaller than a few Hertz such that the system performance is not effected adversely. In some systems, the tolerance to a Doppler shift amounts to 230 Hz, i.e., a vehicle driving at 100 km/h and a carrier frequency of 2.3 GHz result in a Doppler shift of 230 Hz.

When the frequency deviation of repeater output signals are larger than a few Hz, the single frequency network is no longer able to accommodate a Doppler shift of a mobile receiver which can result in a reception breakdown at this receiver.

One possible solution to the problem of repeater output frequency deviation would be to use an oven controlled quartz oscillator (OCXO). An OCXO provides a very stable output signal. Since the repeater systems are intended for outdoor operation, the use of OCXOs would, however, increase the repeater system costs considerably.

Another solution would be to synchronize the repeater system to a common external reference which is provided, for example, by GPS (GPS=Global Positioning System). The GPS provides a one-pulse-per-second signal. Since suitable reference clocks of, for example, 10 MHz can not be derived directly from that GPS signal, additional hardware is required. This additional hardware will, however, also increase the repeater system costs significantly.

Another disadvantage of OCXOs or a GPS hardware is that space requirement for the repeater system are high, in particular, when an oven has to be added to the repeater system.

BRIEF SUMMARY OF THE INVENTION

It is the object of the present invention to provide an economical and reliable repeater concept.

This object is met by a repeater system in accordance with claim 1 and by a method of receiving a modulated input signal and of transmitting a modulated output signal in accordance with claim 16.

The present invention is based on the realisation that a super stable reference source can be dispensed with, because the satellite signal itself, which has a defined frequency, can be used for controlling the repeater output frequency. Thus, a quite inaccurate repeater system clock can be used. The repeater system clock error is, however, computed using the received satellite signal and is compensated for. Thus, the repeater system in accordance with the present invention is synchronized to the satellite as an external reference.

The inventive concept can be implemented with minimum extra costs, since a relatively less accurate reference clock, for example 20 ppm, can be used as clock oscillator for providing the repeater system clock source. All system components influencing the frequency of the repeater system output signal are required to use the same repeater system clock. In the demodulator, a controllable oscillator connected to a local oscillator port of a mixer is arranged for providing an output signal which is derived from the repeater system clock. A feedback means connected to the mixer output and the control input of the controllable oscillator is used for determining a control value which is applied to the controllable oscillator. This control value is determined such that the frequency of the mixer output signal approaches a desired value, which is zero in a preferred embodiment.

In a modulator for again modulating the demodulated signal, another controllable oscillator is connected to another mixer and is arranged for providing an output signal which is derived from the repeater system clock. This oscillator is controlled by another control value which is derived on the basis of the first control value such that the frequency of the modulated output signal approaches a predetermined value.

In accordance with a preferred embodiment of the present invention, the repeater system input signal and the repeater system output signal have different frequencies, both of which are higher than the demodulator and the modulator operating frequencies. In this case, the repeater system further comprises a tuner connected between the repeater system input and the demodulator input for down-converting the repeater system input signal to obtain an intermediate frequency signal. Similarly, the repeater system further comprises an up-converter connected between the modulator output and the repeater system output for up-converting the modulated signal from a modulator intermediate frequency (IF) to a radio frequency (RF) suited for the repeater system output signal.

DRAWINGS

In the following, preferred embodiments of the present invention are described in detail. The detailed description of the preferred embodiments of the present invention proceeds with reference to the accompanying drawings, in which.

DETAILED DESCRIPTION OF THE INVENTION

Figure 1:
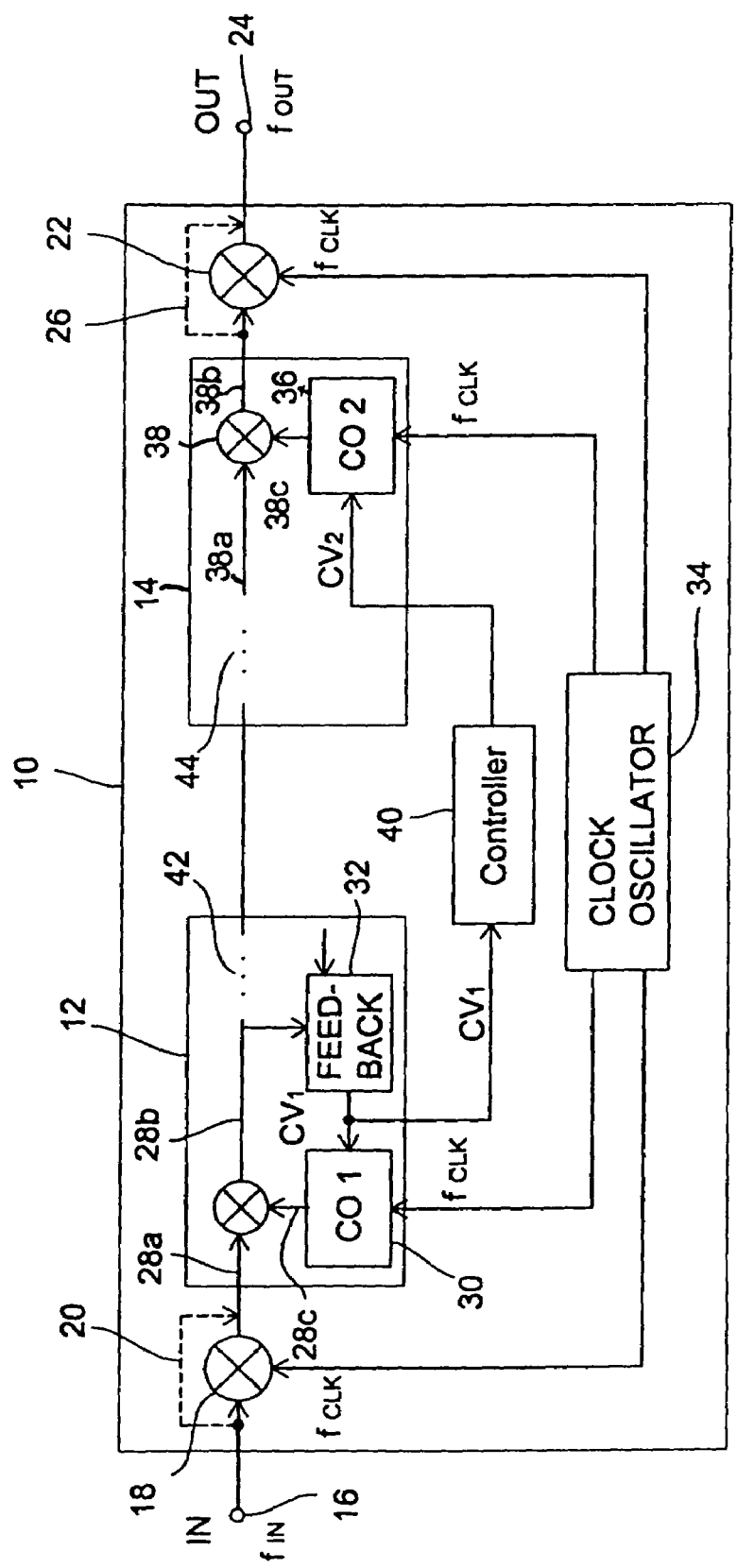
FIG. 1 shows a general block diagram of an inventive repeater system.

In FIG. 1, a repeater system in accordance with the present invention which is indicated by the reference numeral 10 is illustrated. The repeater system 10 generally comprises a demodulator 12 and a modulator 14. Connected between an input 16 of the repeater system 10 and an input of the demodulator 12 is a radio frequency (RF) tuner 18, which can optionally be bypassed by a bypass 20. The bypass 20 will be active when the modulated input signal at the input 16 has a frequency $f_{IN}$ which is small enough that the modulated input signal can be processed by the demodulator 12 directly. Similarly, the repeater system 10 comprises an up-converter 22 between an output of the demodulator 12 and an output 24 of the repeater system 10, which can optionally be bypassed by a bypass 26 when the frequency $f_{OUT}$ of the modulated output signal of the repeater system 10 is small enough such that a desired modulated output signal can be generated by the modulator 14.

The modulator 14 includes a first mixer 28 having an input port 28*a*, an output port 28*b* and a local oscillator port 28*c*. A first controllable oscillator (CO1) 30 is connected to the local oscillator port 28*c* of the first mixer 28. The demodulator 12 further includes feedback means 32 for determining a first control value CV, which is applied to the controllable first oscillator 30, the control value $CV_1$ being determined such that the frequency of a signal at the output port of the first mixer 28 approaches a desired value, preferably zero.

In a very general sense, the feedback means 32 compares the frequency of the signal at the output port 28*b* of the first mixer 28, which can be regarded as an actual value, to a desired frequency, which is in a preferred embodiment zero frequency, and creates the first control value $CV_1$ such that the oscillating frequency of the first controllable oscillator 30 is adjusted to maintain the difference between the actual value and the desired value at the desired value. Thus, the feedback means 32 is schematically shown as having a first input for inputting the actual value and the second input for inputting the desired value, and an output for outputting the control value $CV_1$.

The repeater system shown in FIG. 1 is driven by a clock oscillator 34 which provides a repeater system clock having a clock frequency $f_{CLK}$ which is input into the first controllable oscillator 30, into the RF tuner 18, into the up-converter 22 and into a second controllable oscillator CO 36 which is located in the modulator 14.

As it has been outlined above, the clock oscillator 34 does not limit the accuracy of the output frequency $f_{OUT}$ and, thus, can be a low priced clock oscillator having, for example, an accuracy of 20 ppm. The clock oscillator 34 drives all repeater system components which influence the output frequency $f_{OUT}$. The only requirement for the clock oscillator 34 is that its output signal is stable enough that the feedback loop comprising the feedback means 32 and the first controllable oscillator 30 is able to lock on the satellite signal. Thus, the clock oscillator's required accuracy is defined by the capture and tracking range of the modulator 12. The permitted speed of frequency drift over time is defined by the update rate of the loop and by the tracking performance of the demodulator 12.

Besides the second controllable oscillator 36, the modulator 14 further comprises a second mixer 38 having an input port 38a, an output port 38b and a local oscillator port 38c. The second controllable oscillator 36 is connected to the local oscillator port of the second mixer 38. Thus, the second mixer 38 mixes the signal at its input port 38a and the second controllable oscillator output signal at its local oscillator port 38c to provide a modulated signal at its output port 38b which frequency corresponds to an intermediate frequency when the up-converter 22 is used or corresponds to the frequency of the modulated output signal having the frequency $f_{OUT}$ when the bypass 26 is activated.

The repeater system 10 additionally comprises a controller 40 which is adapted for receiving the first control value $CV_1$ and for outputting a second control value $CV_2$. The controller 40 determines the second control value $CV_2$ on the basis of the first control value such that the frequency of the modulated output signal approaches a predetermined value. As it will be outlined later, the output frequency $f_{OUT}$ can be different from the input frequency $f_{IN}$. Naturally, the input and output frequencies can, however, be equal. In the simplest case, which is based on the fact that the first controllable oscillator 30 and the second controllable oscillator 36 are identical oscillators, the second control value $CV_2$ is determined by the first control value $CV_1$ and the desired output frequency is $f_{OUT}$. When the second controllable oscillator 36 is, however, different from the first controllable oscillator 30, the controller 40 may be arranged to account for any differences between the two controllable oscillators by using a certain calibration value. In this context, it is to be noted that the output signals of the controllable oscillators have to be derived from the clock oscillator, i.e., from the repeater system clock, which can be achieved by frequency division, frequency multiplication, phase locking or by using numerically controlled oscillators which can perform digital frequency division or digital frequency multiplication.

Those skilled in the art will find a variety of different possibilities as to how controllable oscillators can be designed such that their output signal is derived from the repeater system clock ($f_{CLK}$).

As it is symbolized by 42 in the demodulator 12 and 44 in the modulator 14, the demodulator 12 and the modulator 14 can comprise numerous additional functional blocks. For the modulator 14, these functional blocks can include a forward error correction clock introducing a certain redundancy into the information bits by using, for example, a convolutional code. Additionally, the modulator 14 can comprise, in case it performs multi-carrier modulation, a frequency and/or time interleaver for enhancing the transmission and reception performance of the overall system. Apart from that, the modulator 14 can comprise certain multiplexers, time delay stages etc. as necessary. Analogously, the demodulator 12 can comprise corresponding inverse blocks, for example a time and/or frequency deinterleaver, a channel decoder which implements, for example, the well-known Viterbi algorithm, or a decision stage for implementing a hard channel decision etc. In general, it can be stated that the signal at the output of the demodulator 12 which is identical to the signal at the input of the modulator 14 is a demodulated baseband signal on bit level when digital modulation techniques are applied or an analog baseband signal, when only analog modulation techniques are implemented by the repeater system.

Figure 2:
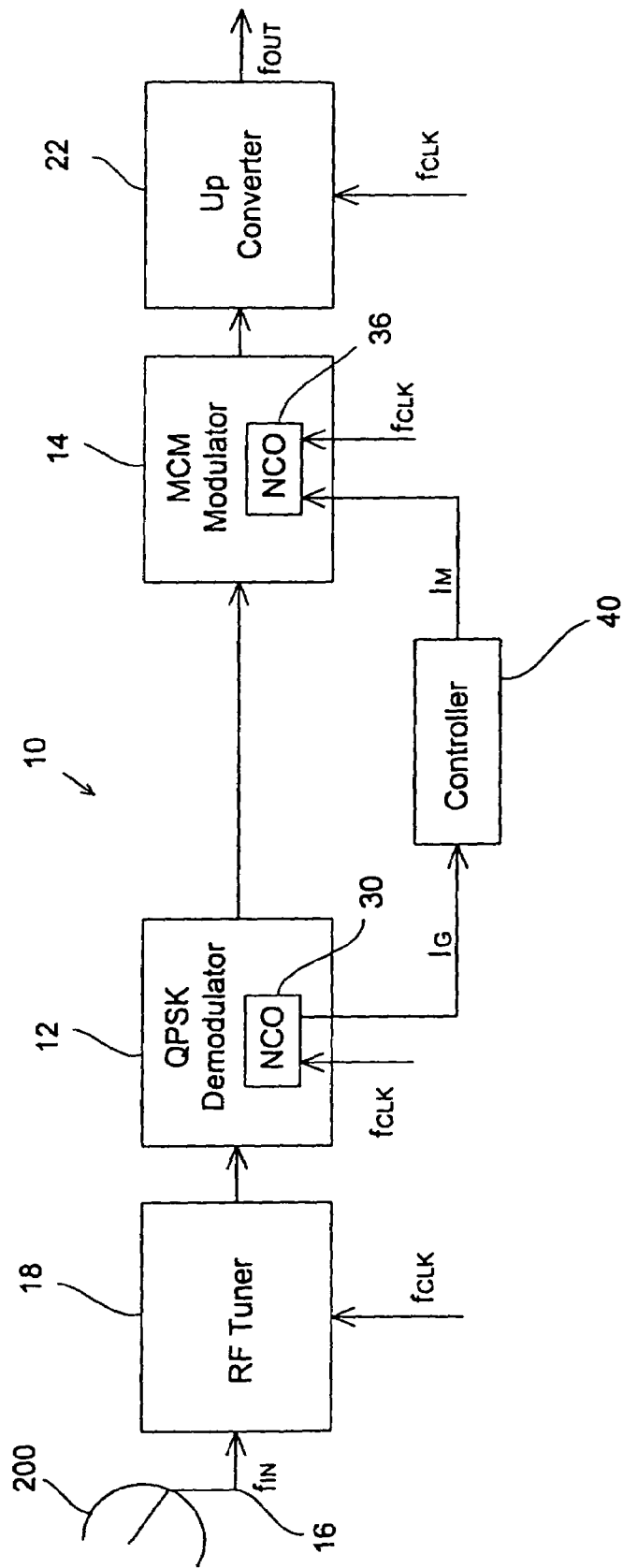
FIG. 2 shows a general block diagram of a preferred embodiment of the present invention, in which numerically controlled oscillators are provided in the demodulator and in the modulator.
Figure 5:
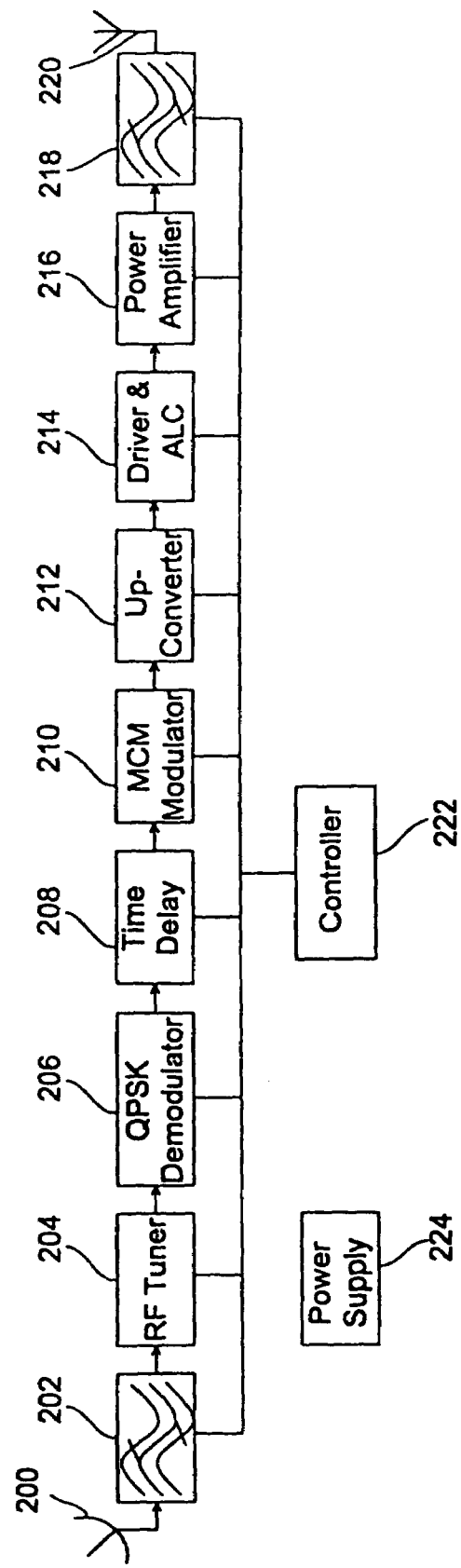
FIG. 5 shows a general block diagram of a complete repeater system.

FIG. 2 shows a block diagram of the general repeater system given in FIG. 1 which is adapted for repeating, i.e., demodulating and again modulating, a QPSK modulated signal. In particular, the repeater system in accordance with a preferred embodiment of the present invention comprises a receiving antenna 200 which is connected to the input 16. The input signal having the frequency $f_{IN}$ is fed into a RF tuner 18 which performs a down-conversion of the received satellite signal in order to output a intermediate frequency signal which is input into the QPSK demodulator 12. The QPSK demodulator 12 outputs a demodulated baseband signal which is fed into the multicarrier modulation modulator 14 which outputs a modulated signal having a certain intermediate frequency. The intermediate frequency signal is input into the up-converter 22 in order to generate the RF signal $f_{OUT}$, which is preferably input into a power amplifier stage 260 (FIG. 5) etc.

The QPSK demodulator 12 and the MCM modulator 14 are shown to comprise a first numerically controlled oscillator 30 and a second numerically controlled oscillator 36, respectively. The particular structure of the numerically controlled oscillator 30 and 36 will be described with reference to FIGS. 3 and 4. In general, it can be stated that a numerically controlled oscillator generates a digital vector from an internal sine/cosine lookup table to provide a complex multiplication of an intermediate frequency signal. The output frequency of a numerically controlled oscillator is determined by its table length and increment. In particular, the output frequency of a NCO equals the ratio between the increment and the table length. When a numerically controlled oscillator 30 is adjusted such that the demodulated signal output from the QPSK demodulator 12 has the desired frequency, for example zero frequency, the increment $I_q$ which is applied to the NCO in order to obtain the desired frequency for the modulated signal is output to the controller 40 which calculates an increment $I_M$ for the NCO in the MCM modulator. The index Q symbolizes the increment of the QPSK demodulator 12, whereas the index M indicates that the increment $I_M$ relates to the NCO in the MCM modulator 13.

Figure 3:
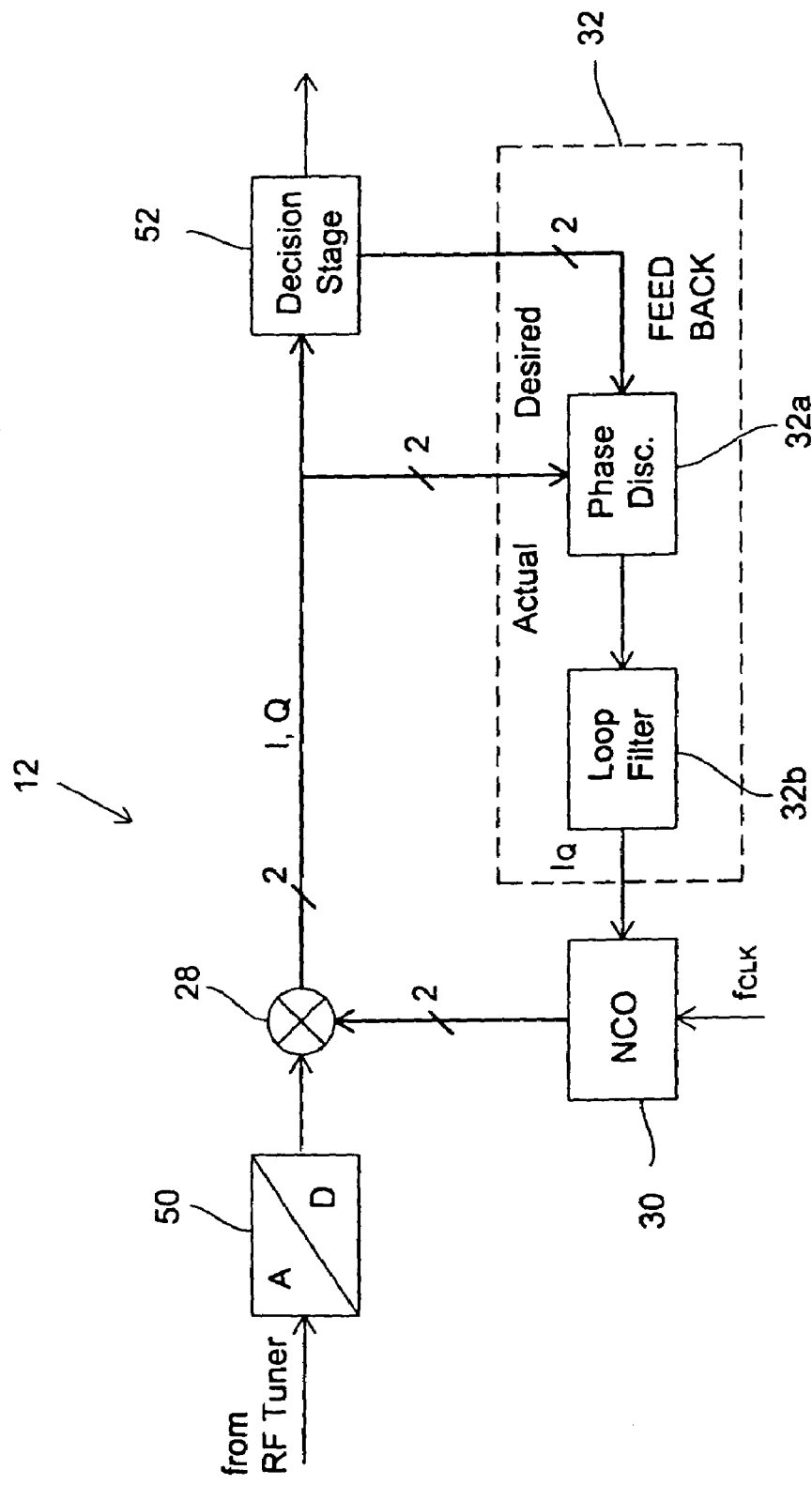
FIG. 3 shows a detailed block diagram of the QPSK demodulator shown in FIG. 2.

With reference to FIG. 3, a specific implementation of the QPSK demodulator 12 is shown which is used for obtaining the increment $I_q$. The QPSK demodulator 12 comprises an analog/digital converter 50 which receives analog output signals from the RF tuner 18 (FIG. 2) and outputs digital values which are fed into the mixer 28 which is implemented as a digital mixer, i.e., as a digital multiplicator. The demodulator 12 further comprises the first controllable oscillator 30 which is implemented as a numerically controlled oscillator. At one input, the NCO receives the repeater system clock indicated by $F_{CLK}$. At another input, the NCO receives an increment $I_Q$ which is output by the feedback means 32. In accordance with the preferred embodiment of the present invention, which is adapted for QPSK modulated signals, the feedback means 32 comprises a phase discriminator 32a and a loop filter 32b. The modulator 12 further comprises as an additional block a decision stage 52 which symbolizes a channel decoder.

The numerically controlled oscillator outputs two orthogonal signals, their frequency being determined by the table length of the NCO 30 and the increment $I_Q$ output by the loop filter 32b. The two orthogonal signals, i.e., the two signals having a phase difference of 90°, are applied to the multiplicator 28 in order to perform a complex mixing (multiplication). Thus, the multiplicator 28 outputs at its output port two orthogonal components, i.e., an I component and a Q component, as it is well-known in the art. The actual I/Q components are input in the phase discriminator 32a. The phase discriminator 32a further receives desired I/Q values. The phase discriminator 32a forms the difference between the actual values and the desired values and adjusts the increment $I_Q$ via the loop filter 32b until the difference approaches the desired value. In this case, complex output signals output by the first mixer 28 have the required zero carrier frequency.

The function of the circuit shown in FIG. 3 can be described more figuratively. As it is well-known, the quarternary phase shift keying (QPSK) modulation technique operates such that only four modulation symbols exist in the complex plane. In a particular implementation, one modulation symbol (00) corresponds 45°, another modulation symbol (01) corresponds 135°, another modulation symbol (10) corresponds 225° and the fourth modulation symbol (11) corresponds 315°. Naturally, different modulation symbol definitions can be applied.

When the carrier frequency of the I/Q components is at the desired value, i.e., when the difference determined by the phase discriminator 32a approaches zero, a complex pointer swings between the particular modulation states in accordance with the modulated information. When, however, a carrier frequency of the I/Q components has a value different from the desired value, a rotation at constant speed of the pointer in the complex plane is superimposed over the swinging of the pointer between the different modulation states. Thus, the circuit shown in FIG. 3 operates to extract the constant speed rotation of the pointer in the complex plane such that only the swinging of the pointer between the modulation states remains.

When the constant speed rotation has been extracted, the NCO is fed by a specific $I_Q$, which can be regarded as the first control value $CV_1$. More generally, the control value $CV_1$ can be regarded as the ratio between the increment $I_Q$ and the table length of the NCO 30. However, the table length is equal for both NCOs. Thus, only the increment $I_Q$ determines the frequencies of the NCO output signals.

Figure 4:
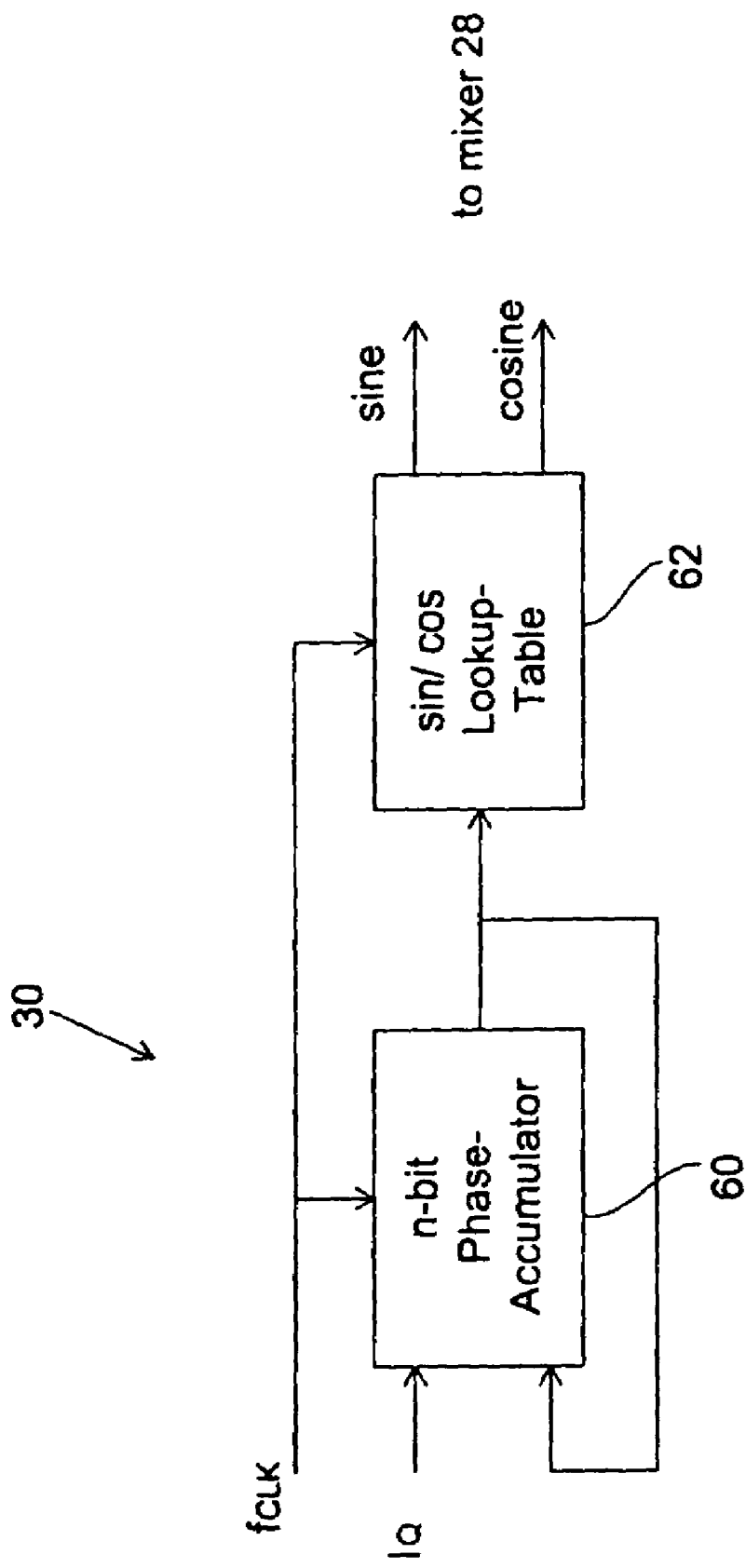
FIG. 4 shows an internal block diagram of a numerically controlled oscillator.

FIG. 4 gives a schematic block diagram of an NCO setup. The NCO comprises an N-bit phase accumulator 60 and a sine/cosine lookup table 62. The phase accumulator 60 and the lookup table 62 are fed by the repeater system clock indicated by $f_{CLK}$, whereas the phase accumulator 60 is fed by the increment $I_Q$. The sine/cosine lookup table 62 outputs two orthogonal signals to the mixer 28. To better illustrate the function of the NCO, a practical example will be given. When the clock oscillator frequency, i.e., the frequency of the repeater system clock, is set to 16 MHz, and when a frequency resolution of 1 Hz is required, a NCO having a table length of 24 bits may be acceptable. The largest number which can be represented by a 24 bit number is 16,772,216 ($2^{24}$) Thus, one increment ($1/2^{24}$) roughly amounts to 0.95 which is approximately 1 Hz. Thus, incrementing the NCO by one increment will increase the output signal of the NCO by approximately 1 Hz. The particular output frequency of the NCO is determined by the absolute value of the increment. Thus, for example, an increment of 100,000 yields a NCO output frequency of 95.396 kHz.

With reference to FIGS. 3 and 4, the generation of a first controllable oscillator increment $I_Q$, i.e., the first control value $CV_1$, has been described. As it is shown in FIG. 1, block 14, the modulator 14 also comprises a controllable oscillator which can be implemented as a numerically controlled oscillator having the same table length as the numerically controlled oscillator in the demodulator 12. However, different table lengths can easily be implemented which will be evident after reviewing the detailed calculations given below. In any case, the controllable oscillator 36 in the modulator is controlled by the second control value $CV_2$ which is derived from, at least, the first control value $CV_1$.

The calculation of the second control value $CV_2$ is performed by the controller 14.

As it has been stated above, the carrier frequency at the output of the demodulator 12 has a desired value of preferably 0. This can be expressed by the following equation 1:

$$f_{IN} - a \cdot f_{CLK} = I_Q/T_Q \cdot f_{CLK} \qquad \text{(Equ. 1)}$$

The symbols in equation 1 are defined as follows:

| | |
|---|---|
| $f_{IN}$: | Carrier input frequency |
| $a \cdot f_{CLK}$: | Frequency shift of the tuner |
| $I_Q$: | Increment of QPSK NCO |
| $T_Q$: | Table length of QPSK NCO |
| $f_{CLK}$: | Repeater System Clock |

It has to be stated that in the RF tuner 18, certain frequency divisions or multiplications can be performed. Thus, the factor a can be regarded as a real number.

It is to be stated that the unknown variable in equation 1 is the frequency $F_{CLK}$ of the repeater system clock. Since $I_Q$ can be read from the QPSK demodulator and all other parameters in equation 1 are known, the reference clock frequency $F_{CLK}$ can be calculated as follows:

$$f_{CLK} f_{IN}/(a + I_Q/T_Q) \qquad \text{(Equ. 2)}$$

In the modulator, i.e., the transmit path, the output frequency $f_{OUT}$ is related to the increment $I_M$, the table length $T_M$ of the NCO in the MCM modulator, and the up-converter factor d as follows:

$$f_{OUT} = I_M/T_M \cdot f_{CLK} + d \cdot f_{CLK} \qquad \text{(Equ. 3)}$$

The variables in equation 3 are given as follows:

| | |
|---|---|
| $f_{OUT}$: | Carrier output frequency |
| $I_M$: | Increment of MCM NCO |
| $T_M$: | Table length of MCM NCO |
| $d \cdot f_{CLK}$: | Upconverter frequency shift |

Since $f_{CLk}$ and the upconverter multiplication factor d are known, the MCM NCO increment $I_M$ can be computed such that the output frequency $f_{OUT}$ can be set to the exact desired value:

$$I_M = (f_{OUT}/f_{CLK} - d) \cdot T_M = (f_{OUT}/(f_{IN}/(a + I_Q/T_Q)) - d)) \cdot T_M \qquad \text{(Equ. 4)}$$

When equation 4 if reformulated such that $f_{OUT}$ is on the left side thereof, equation 5 is obtained $$f_{OUT} = (I_M/T_M + d) \cdot f_{CLK} = (I_M/T_M + d) \cdot f_{IN}/(a + I_Q/T_Q) \qquad \text{(Equ. 5)}$$

It is to be noted that, in all equations, a quotient $I_Q/T_Q$ represents the first control value $CV_1$. Analogously, the quotient $I_M/T_M$ represents the second control value $CV_2$. Additionally, it has to be noted that, when the bypass 20 (FIG. 1) is activated, the RF tuner multiplication factor a has to be set to 0 in the equations. Similarly, the up-conversion multiplication factor d has to be set to 0 in the equations, when the bypass 26 (FIG. 1) is activated. When both bypasses 20 and 26 are activated, the repeater system 10 does not perform any down-conversion or up-conversion operations.

It can be seen that equation does not include the parameter $f_{CLK}$. Thus, equation 5 is independent on the repeater system clock. Since the output frequency $f_{OUT}$ is not dependent on $f_{CLK}$, a significantly smaller and inexpensive oscillator can be used. Its required accuracy is only defined by the capture and tracking range of the QPSK demodulator 12. The permitted speed of frequency drift over time is defined by the update rate of the loop and tracking performance of the QPSK demodulator. The NCO table length in the QPSK demodulator and MCM modulator have to be high enough to provide a sufficient resolution of both NCO frequencies. Because NCOs having 32 or more bits table length and 16 bit multipliers are easily available on the market, this components will not increase the costs of the repeater system significantly. In many applications, even a 24 bit table length and a 10 bit multiplier are sufficient.

What is claimed is:

1. A repeater system for receiving a modulated input signal and for transmitting a modulated output signal, comprising:
   a clock oscillator for providing a repeater system clock;
   a demodulator for demodulating an input signal to obtain a demodulated signal, the input signal being the modulated input signal or a signal derived from the modulated input signal, the demodulator including:
      a first mixer which is arranged for receiving the input signal at an input port, the first mixer additionally having a local oscillator port and an output port;
      a first controllable oscillator connected to the local oscillator port of the first mixer, the first controllable oscillator being arranged for providing an output signal which is derived from the repeater system clock;
      feedback means having a first input for receiving a frequency of the signal at the output port of the first mixer as an actual value and a second input for receiving a desired value for the frequency of the signal at the output port of the first mixer, the feedback means being arranged for determining a first control value, which is applied to the controllable first oscillator, the control value being determined such that the actual value approaches the desired value;
   a modulator for modulating the demodulated signal to obtain a modulated signal, the modulated signal being the modulated output signal or a signal from which the modulate output signal is derived, including:
      a second mixer which is arranged for receiving the demodulated signal at a input port and for providing the modulated output signal at an output port;
      a second controllable oscillator connected to the local oscillator port of the second mixer, the second controllable oscillator being arranged for providing an output signal which is derived from the repeater system clock, the second oscillator being controlled by a second control value; and
      a controller for receiving the first control value and for providing the second control value, the controller being arranged for determining the second control value on the basis of the first control value and a predetermined value of the frequency of the modulated output signal such that the frequency of the modulated output signal approaches the predetermined value.

2. The repeater system of claim 1, which is arranged for receiving the modulated input signal, which frequency is higher than a predetermined demodulator input frequency, the repeater system further comprising:
   a tuner for down-converting the modulated input signal to obtain a modulated intermediate frequency signal forming the demodulator input signal, the tuner being arranged for using a tuner oscillator signal, which is derived from the repeater system clock; and
   wherein the controller is arranged for determining the second control value further on the basis of the ration of the modulated input signal frequency and the repeater system clock frequency.

3. The repeater system of claim 1, which is arranged for transmitting the modulated output signal, which frequency is higher than a predetermined modulator output frequency, the repeater system further comprising:
   an up-converter for up-converting the modulated signal to obtain the modulated output signal, the up-converter using a converter oscillator signal which is derived from the repeater system clock; and
   wherein the controller is arranged for determining the second control value further on the basis of the ratio of the frequency of the modulated output signal and the repeater system clock frequency.

4. The repeater system of claim 1, further comprising an analog/digital converter having its output connected to the demodulator for providing digital demodulator input signal.

5. The repeater system of claim 1, wherein the modulated signal has been modulated by a complex I/Q modulation technique.

6. The repeater system of claim 4, wherein the first and second controllable oscillators are numerically controlled oscillators, each numerically controlled oscillator having:
   a N-bit phase accumulator; and
   a sine/cosine lookup table for outputting a sine signal and a cosine signal, the frequencies thereof being determined by the first and second control values, respectively, each control value being determined by the ratio of a respective increment and a respective table length of the respective lookup tables.

7. The repeater system of claim 6, wherein the first mixer is a complex multiplier receiving at its local oscillator port the sine signal and the cosine signal output by the first numerically controlled oscillator, and outputting at its output port a complex signal having an in phase component and a quadrature component.

8. The repeater system of claim 6, further comprising a decision stage arranged for receiving at an input port thereof the I/Q components and outputting at an output thereof phase values on the basis of the I and Q components, these phase values representing the demodulated signal.

9. The repeater system of claim 8, wherein the feedback means comprises:
   a phase discriminator arranged for receiving, as actual values, the I and Q components and, as desired values, the phase values output by the decision stage, and for outputting a phase difference between the actual values and the desire values; and a loop filter for receiving the phase difference and for outputting the increment for the first numerically controlled oscillator such that the output frequency of the numerically controlled oscillator equals the frequency of the modulator input signal.

10. The repeater system of claim 1, wherein the feedback means is arranged to determine the first control value such that the desired value is zero.

11. The repeater system of claim 1, wherein the demodulator has a specified capture and tracking range and wherein the required accuracy of the clock oscillator is determined by the specified capture and tracking range rather than by the required accuracy of the modulated output signal frequency of the repeater system.

12. The repeater system of claim 1, wherein the controller is arranged for implementing the following equation for obtaining the second control value:

$$CV_2 = f_{OUT} \cdot CV_1 / f_{IN}$$

wherein $f_{OUT}$ represents the modulated output signal frequency,
$fI_N$ represents the modulate input signal, and
$CV_1$ represents the first control value.

13. The repeater system of claim 2, wherein the controller is arranged for implementing the following equation for obtaining the second control value:

$$CV_2 = f_{OUT}/[f_{IN} \cdot (a + CV_1)] - d$$

wherein $f_{OUT}$ represents the modulated output signal frequency, $f_{IN}$ represents the modulated input signal, $CV_1$ represents the first control value, a represents a fixed ratio between the tuner oscillator frequency and the repeater system clock frequency, and d represents a fixed ratio between the modulated output signal frequency and a repeater system clock frequency.

14. The repeater system of claim 7, wherein the table length of both numerically controlled oscillators is 24 bits and wherein the multiplier is a 10-bit multiplier.

15. The repeater system of claim 1, which is adapted for receiving a satellite signal as the modulated input signal, and for transmitting the modulated output signal into a terrestrial single frequency network.

16. Method of receiving a modulated input signal and transmitting a modulated output signal, comprising the following steps:

providing a repeater system clock;

demodulating the modulated input signal or a signal which is derived from the modulated input signal, to obtain a demodulated signal wherein the step of demodulating comprises the following substeps:

mixing the modulated signal or the signal derived from the modulated signal using an oscillator signal output by a first controllable oscillator, which output signal is derived from the repeater system clock to obtain a mixed signal;

on the basis of the frequency of the mixed signal as an actual value and a desired value for the frequency of the mixed signal, determining the first control value applied to the first controllable oscillator such that the frequency of the mixed signal approaches the desired value;

modulating the demodulated signal to obtain the modulated output signal or a signal from which the modulated output signal is derived, wherein the step of demodulating comprises the following substeps:

mixing the demodulated signal or a signal which is derived from the demodulated signal using an oscillator signal output by a second controllable oscillator which output signal is derived from the repeater system clock;

determining a second control value, on the basis of the first control value and a predetermined value of the frequency of the modulated output signal, such that the frequency of the modulated output signal approaches a predetermined value; and controlling the second controllable oscillator by applying the second control value to the second controllable oscillator.

* * * * *